(12) United States Patent
Leonard

(10) Patent No.: US 7,845,164 B2
(45) Date of Patent: Dec. 7, 2010

(54) METHOD AND SYSTEM FOR STORING AN ADDITIVE AND INJECTING IT INTO THE EXHAUST GASES OF AN ENGINE

(75) Inventor: Stephane Leonard, Brussels (BE)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 633 days.

(21) Appl. No.: 11/721,629

(22) PCT Filed: Dec. 13, 2005

(86) PCT No.: PCT/EP2005/056747

§ 371 (c)(1),
(2), (4) Date: Jun. 13, 2007

(87) PCT Pub. No.: WO2006/064001

PCT Pub. Date: Jun. 22, 2006

(65) Prior Publication Data

US 2009/0249766 A1    Oct. 8, 2009

(30) Foreign Application Priority Data

Dec. 14, 2004   (FR)   ................................ 04 13269

(51) Int. Cl.
*F01N 3/00*  (2006.01)
*F01N 3/10*  (2006.01)
*F01N 3/02*  (2006.01)
*F01N 5/02*  (2006.01)
*F02M 37/00* (2006.01)
*F16K 49/00* (2006.01)
*F16L 53/00* (2006.01)

(52) U.S. Cl. .............................. 60/295; 60/303; 60/320; 123/514; 137/339

(58) Field of Classification Search ................... 60/286, 60/320, 295, 303; 123/514, 540; 137/339
See application file for complete search history.

(56) References Cited

U.S. PATENT DOCUMENTS 5,758,820 A * 6/1998 Celorier et al. ............. 237/2 B (Continued)

FOREIGN PATENT DOCUMENTS

DE    197 29 003 A1    2/1999

(Continued)

OTHER PUBLICATIONS

Manfred Weigl, Machine Translation of DE 19935920 A1, Mar. 15, 2001.*

(Continued)

*Primary Examiner*—Thomas E Denion
*Assistant Examiner*—Audrey Klasterka
(74) *Attorney, Agent, or Firm*—Oblon, Spivak, McClelland, Maier & Neustadt, L.L.P.

(57) ABSTRACT

A method for storing an additive and injecting the additive into exhaust gases of an engine supplied with fuel from a fuel tank and returning unused excess hot fuel to the tank via a return line. The method heats the additive using a section of the return line when the additive temperature is below or equal to a threshold value, and short circuits the heating section when the additive temperature exceeds the threshold value. A system for implementing such a method includes an additive heating section including a section of the return line; a temperature sensor; and a device allowing the heating section to be short circuited when the temperature measured by the sensor exceeds the threshold value.

17 Claims, 1 Drawing Sheet

U.S. PATENT DOCUMENTS

| | | | |
|---|---|---|---|
| 5,904,292 A * | 5/1999 | McIntosh | 236/37 |
| 6,223,526 B1 | 5/2001 | Wissler et al. | |
| 6,301,879 B1 | 10/2001 | Weisweiler et al. | |
| 7,449,162 B2 * | 11/2008 | Schaller et al. | 423/212 |
| 2003/0005913 A1 * | 1/2003 | Shelor et al. | 123/541 |
| 2003/0101715 A1 | 6/2003 | Huthwohl | |
| 2004/0025498 A1 * | 2/2004 | Lambert et al. | 60/286 |
| 2005/0207936 A1 * | 9/2005 | Berryhill et al. | 422/63 |

FOREIGN PATENT DOCUMENTS

| | | | |
|---|---|---|---|
| DE | 199 40 298 A1 | 3/2001 | |
| DE | 19935920 A1 * | 3/2001 | |
| EP | 1 388 648 A1 | 2/2004 | |
| WO | WO 2004042208 A1 * | 5/2004 | |

OTHER PUBLICATIONS

Manfred Weigl, English Abstract of DE 19935920 A1, Mar. 15, 2001.*

Manfred Weigl, Babel Fish translation of p. 3 paragraph 10 of DE 19935920 using http://babelfish.yahoo.com, Mar. 15, 2001.*

* cited by examiner

METHOD AND SYSTEM FOR STORING AN ADDITIVE AND INJECTING IT INTO THE EXHAUST GASES OF AN ENGINE

BACKGROUND OF THE INVENTION

1. Field of the Invention

With the forthcoming entry into force of the Euro IV standards on exhaust emissions for heavy goods vehicles, devices for removing NOx (or oxides of nitrogen) pollution need to be fitted.

2. Description of the Related Art

The system adopted by most heavy goods vehicles manufacturers to reduce NOx emissions to the required value generally consists in performing selective catalytic reaction using reducing agents such as urea (urea "SCR" for selective catalytic reduction, using the ammonia generated in situ in the exhaust gases by the decomposition of the urea).

To do this, it is necessary to equip the vehicles with a tank containing a solution of urea, and with a device for metering the amount of urea to be injected into the exhaust line. Given that the aqueous urea solution generally used for these purposes (with an eutectic at 32.5% by weight of urea) freezes at $-11°$ C., it is necessary to provide a heating device in order to liquefy the solution so that it can be injected into the exhaust line under cold-start conditions at freezing temperatures.

Several systems have been provided for this purpose in the prior art. In general, these systems comprise fairly expensive heating devices involving either special-purpose heating elements or a bypass on the engine cooling circuit.

US application 2003/0101715 proposes to solve this problem by using the fuel return line present on certain engines (direct injection diesel engines, particularly of the "common rail" type) to heat the additive. However, when the outside temperature is high enough, there is no need, and it is even sometimes not desirable, to heat the urea solution because doing so might cause its premature decomposition and the emission of undesired odorous vapours (which is something that already occurs upwards of $60°$ C. with the aforementioned eutectic point). Furthermore, the system proposed in that document is unable effectively to cool the diesel return in the event of high temperatures.

This application aims to solve these problems by proposing a method and a system for storing a reducing additive and injecting it into the exhaust gases of an engine which is effective and not excessively odorous irrespective of the ambient temperature and which does allow effective cooling of the fuel return if necessary.

SUMMARY OF THE INVENTION

To this end, the present invention relates to a method for storing an additive and injecting it into the exhaust gases of an engine supplied with fuel from a fuel tank and returning the unused excess hot fuel to the said tank via a return line, the said method consisting in heating the additive using a section of the return line when the additive temperature is below or equal to a threshold value $T1$, and in short circuiting the heating section when the additive temperature exceeds the threshold value $T1$.

The expression "additive temperature" is preferably to be understood as meaning the temperature of the additive at its storage location (additive tank).

This threshold temperature $T1$ may for example be $40°$ C., preferably $30°$ C. or even $20°$ C. This is because at temperatures of $40°$ C. and above, many additives are liable to give off aggressive and/or malodorous vapours, a phenomenon that the present invention is able to avoid.

In consequence, according to the invention, it is preferable for the additive not to be in contact with the hot fuel return except in the heating section. What that means is only the heating section is close enough and arranged in such a way that it can influence the temperature of the additive, the remainder of the fuel return line being sufficiently remote and/or insulated that any transfer of heat to the additive is avoided.

The present invention also relates to a system for implementing the abovementioned method. In particular, it relates to a system for storing an additive and injecting it into the exhaust gases of an engine supplied with fuel from a fuel tank and returning the unused excess hot fuel to the said tank via a return line comprising at least one section in thermal contact with the additive (or additive heating section), the said system comprising a temperature sensor and a device allowing the heating section to be short circuited when the temperature measured by the sensor exceeds a preset value (threshold $T1$).

DETAILED DESCRIPTION OF THE PREFERRED EMBODIMENTS

Figure 1:
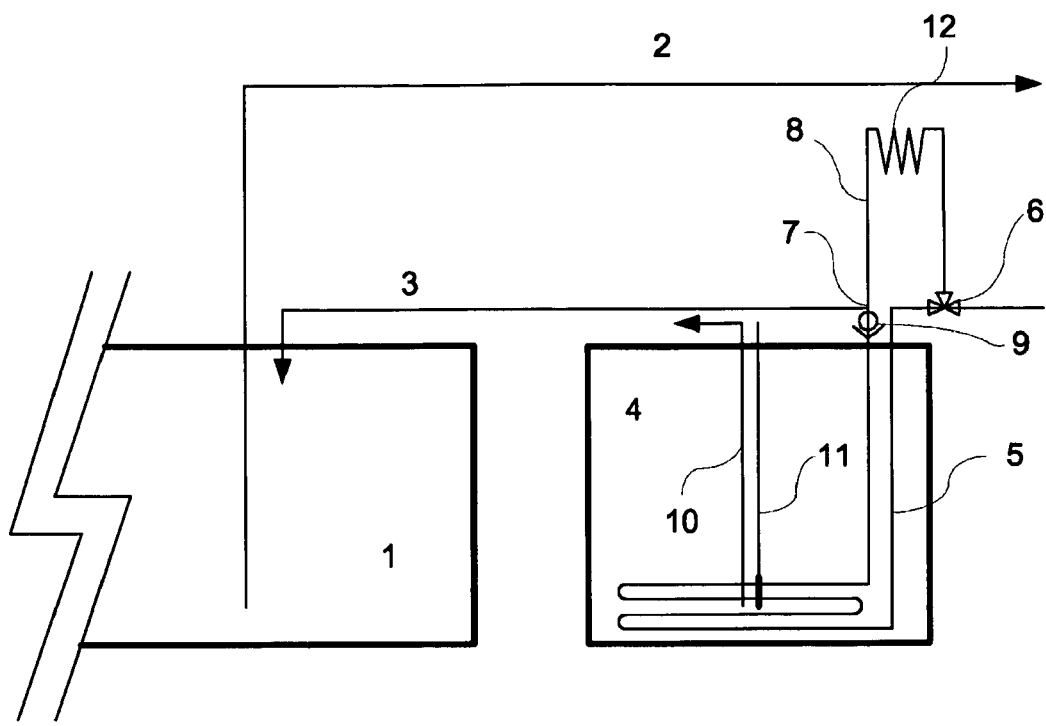
FIG. 1 is a schematic view of one example of the invention.

In other words such a system comprises:
- an additive heating section which consists of a section of the return line;
- a temperature sensor; and
- a device allowing the heating section to be short circuited when the temperature measured by the sensor exceeds the threshold value $T1$.

The additive at issue in the context of the invention is preferably a reducing agent capable of reducing the NOx present in the exhaust gases of internal combustion engines. It is advantageously ammonia used directly (which presents the associated disadvantages of safety and of corrosion) or generated in situ, in the exhaust gases, from a precursor such as urea (making it possible to avoid the aforementioned disadvantages). The invention yields good results with urea and, in particular, with aqueous urea solutions. Eutectic solutions (containing 32.5% by weight of urea) are particularly suitable.

The present invention may be applied to any internal combustion engine comprising a fuel return line, i.e. a line returning the excess fuel not used by the engine to the fuel tank. It is advantageously applied to direct injection diesel engines and, in particular, to heavy goods vehicle diesel engines. This is because, in such engines, it is quite common for the fuel return temperature to be between 60 and $90°$ C., the temperature at which certain additives (and especially urea solutions) decompose.

The system according to the invention comprises at least one tank intended for storing the additive and at least one supply line intended to convey the additive to an exhaust pipe of the engine. The additive storage tank is generally situated near the return line, between the engine and the fuel tank. Advantageously, it is situated near the latter, particularly in order to guarantee better accessibility for filling. Furthermore, it is advantageous for these two tanks to be kept away from the exhaust system and from the engine, where temperatures are high.

The system according to the invention generally also comprises a pick-up device for conveying the additive from the additive tank to the injector. This device is generally a pump.

Given the corrosive environment, this device is preferably situated outside the additive tank and its constituent materials are preferably chosen from corrosion-resistant metals (certain grades of stainless steel and of aluminum in particular). Recourse to copper, even for connectors, is not desirable.

The system according to the invention is generally also equipped with an injector for injecting the additive into the exhaust gases. In the case of heavy goods vehicles, this injector advantageously uses the compressed air available in the braking circuit in order to disperse and inject the additive.

Most often also, the system according to the invention comprises a computer connected to the injector and allowing the required amount of additive (particularly according to the following parameters): level of emission and conversion of NOx; temperature and pressure; engine speed and load, etc.) to be injected into the exhaust gases.

According to the invention, the return line returning the hot fuel from the engine to the fuel tank comprises at least one so-called heating section in thermal contact with the additive and capable of heating it before it is injected into the engine exhaust gases. To do this, this section may be at least partially substantially contiguous with the additive supply line (for example the two lines may be coaxial) and/or at least partially inside the additive tank.

It is particularly advantageous for the heating section to be at least partially situated inside the additive tank so as to be able to melt the reserve of additive should it freeze and allow the system to start up quickly. In this case, it is preferable for this part to at least partially be in the form of a coil (a winding or zigzag of loops). As a particular preference, this coil at least partially surrounds the additive pick-up point. This coil may be formed of a straight stainless steel tube or a corrugated plastic tube (which is more economical and provides a larger heat exchange area but suffers from the disadvantage of impaired thermal conductivity). It may also be designed in such a way that only its "active" part (the actual coil bit, as opposed to its ends) is situated in the bottom of the additive tank so as to avoid heating the latter at the surface and generating aggressive or malodorous vapours.

The result of the foregoing is that, as a quite especial preference, the system according to the invention comprises a device for drawing up the additive from a point of the additive tank, the part of the section situated in the additive tank at least partially has the form of a coil near the pick-up point and this coil and the pick-up point are in the bottom of the additive tank.

The system according to the invention is essentially characterized by the presence of a temperature sensor. This sensor is preferably placed inside the additive tank and as a quite special preference at a point close to the additive pick-up point so as to make sure that the additive at this point is in the liquid (injectable) state when the pick-up device is triggered. It is for example possible to anticipate for the sensor to activate the said pick-up device only if the temperature is above a threshold temperature T2 at which the additive is liquid. This temperature T2 may for example be −10° C., preferably −5° C. or even 0° C.

It should be noted that this sensor may also serve other functions in the system and, in particular, may serve to communicate with the aforementioned computer and refine the precision with which the additive is metered.

This sensor may be of any known type, preferably based on corrosion-resistant material(s). It is preferably a thermocouple coated in a fine layer of a material that is able to chemically resist the additive.

The threshold temperature T1 that the sensor has to detect in the context of the invention may for example be 40° C., preferably 30° C. or even 20° C. Above and beyond this temperature, according to the invention, the additive heating section is bypassed using a suitable device.

According to a preferred variant of the invention, the temperature sensor (directly or indirectly via a computer) controls a valve and it is this valve that allows the said section to be short circuited (bypassed) when the temperature in the additive tank exceeds the preset threshold T1. This valve directs the hot fuel return to the fuel tank without passing through the heating section and does so via what is known as a bypass line which terminates at a point on the fuel return line situated downstream of the said section.

In the aforementioned variant, it is advantageous for the valve to be a three-way valve allowing a point on the fuel return line upstream of the heating section to be connected either to the said heating section or to the bypass line. It may also be advantageous for this point (or, more precisely, a location close to this point on the bypassed section) to be equipped with a nonreturn valve preventing the hot fuel from flowing backwards into the heating section when the latter is short circuited.

Because the heating section can be bypassed, the system according to the invention easily allows the hot fuel not used by the engine to be cooled before it is supplied to the tank, and for this to be the case irrespective of the temperature conditions. In order to achieve this, all that is required, for example, is for the aforementioned bypass line to be equipped with a heat exchanger. Specifically, when the additive is at a temperature below the temperature sensor threshold value, the fuel will flow through the heating section, heat the additive and become cooled; and when the additive temperature exceeds this threshold temperature, the fuel will flow through the bypass line where it may be cooled by the heat exchanger.

Preferably the system according to the invention comprises a device regulating the quantity of heat that is transported by the fuel in the fuel return line, in particular in the heating section of this line.

In a particular embodiment, the heat regulation is performed by the control of the fuel temperature that flows in the heating section.

Preferably, the control of the fuel temperature is performed by a heat exchanger that is located upstream the heating section.

In another embodiment, the heat regulation is performed by the control of the flow of the fuel which circulates in the heating section.

Preferably the control of the flow is performed by a controlled valve.

The present invention is illustrated nonlimitingly by FIG. 1.

This FIGURE depicts a variant of the system according to the invention intended for a diesel fuel tank (1) comprising a supply line (2) to a diesel engine (not depicted) and a return line (3) returning the diesel fuel not used by the engine, and which has been heated thereat, to the fuel tank (1).

This system comprises a urea tank (4) containing an aqueous urea solution containing 32.5% by weight of urea (eutectic). This tank houses within it a section (5) of the hot diesel return line (3) which has the form of a coil surrounding the region from which the additive is withdrawn (the point at which a withdrawing line (10) ends), where a temperature sensor (11) is also located. This section can be short circuited using a three-way valve (6) the effect of which is to direct the hot diesel fuel directly to a point (7) downstream of the section (5) by means of a bypass line (8). Just prior to the junction point (7) the section (5) is provided with a nonreturn valve (9) preventing the hot diesel fuel from passing from the line (8) into the section (5) in the event of bypass. The bypass line (8) collaborates with a heat exchanger (12) so that the diesel fuel flowing therein can be cooled as necessary.

The invention claimed is:

1. A method for storing an additive and injecting the additive into exhaust gases of an engine supplied with fuel from a fuel tank and returning unused excess hot fuel to the tank via a return line, the method comprising:
heating the additive using a section of the return line when the additive temperature is below or equal to a threshold value; and
short circuiting the heating section when the additive temperature exceeds the threshold value.

2. The method according to claim 1, wherein the additive is an aqueous urea solution.

3. The method according to claim 1, wherein the engine is a direct injection diesel engine.

4. The method according to claim 1, wherein the threshold value is 40° C.

5. The method according to claim 1, further comprising positioning an additive tank, in which the additive is stored, between the fuel tank and an engine supplied with fuel by the fuel tank.

6. The method according to claim 1, wherein the short circuiting is performed via a three-way valve that diverts the entire flow within the section of the return line from heating the additive.

7. The method according to claim 1, wherein the threshold value is an upper threshold (T1), and the pick-up device activates to allow flow of additive if the temperature of the additive is above a lower threshold (T2).

8. The method according to claim 7, wherein (T1) is 40° C., and (T2) is −5° C.

9. A system for implementing the method according to claim 1, comprising:
an additive heating section including a section of the return line;
a temperature sensor; and
a device allowing the heating section to be short circuited when the temperature measured by the sensor exceeds the threshold value.

10. The system according to claim 9, wherein the temperature sensor controls a three-way valve that allows a point on the return line upstream of the heating section to be connected either to the heating section or to a bypass line that terminates at a point on the return line situated downstream of the heating section.

11. The system according to claim 10, wherein the heating section includes a nonreturn valve before the junction point, the nonreturn valve preventing excess hot fuel from passing from the line into the heating section in an event of bypass.

12. The system according to claim 10, wherein the bypass line includes a heat exchanger configured to cool the excess return line as the excess hot fuel flows through the return line.

13. The system according to claim 9, further comprising a tank to store the additive, and wherein the additive heating section is at least partially situated inside the tank.

14. The system according to claim 13, wherein the tank to store the additive is disposed between the fuel tank and an engine supplied with fuel from the fuel tank.

15. The system according to claim 13, further comprising a device for drawing up the additive from a point of the additive tank using a pick-up line, wherein the part of the section situated in the additive tank at least partially has a form of a coil near the pick-up point, and wherein the coil and the pick-up point are in the bottom of the additive tank.

16. The system according to claim 15, wherein the temperature sensor is also placed inside the additive tank, at a point, close to the pick-up point, and wherein the temperature sensor is configured to trigger the additive pick-up device only if the temperature measured by the temperature sensor is above a given temperature at which the additive is liquid.

17. The system according to claim 15, wherein the coil surrounds the pick-up line.

* * * * *